Aug. 3, 1965 W. L. BOWEN III 3,198,222
IDLER PULLEY AND END MOUNTING FOR A CHAIN SAW
Filed June 18, 1963
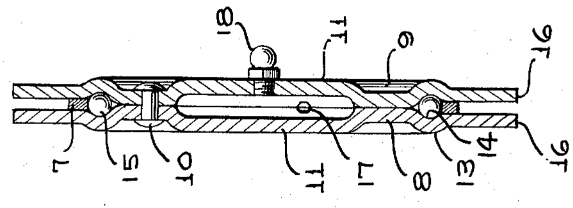
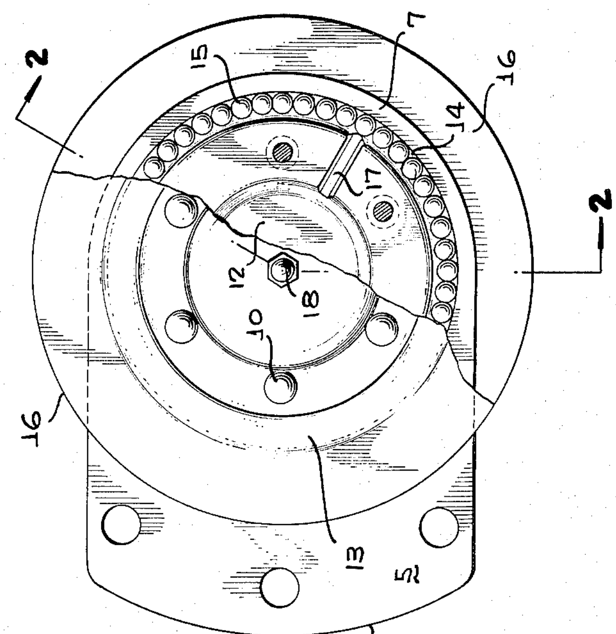
WILLARD L. BOWEN III
INVENTOR
BY Mason, Porter, Diller & Stewart
ATTORNEYS United States Patent Office 3,198,222
Patented Aug. 3, 1965

3,198,222
IDLER PULLEY AND END MOUNTING FOR A CHAIN SAW

Willard L. Bowen III, Harwinton, Conn., assignor to The Torrington Company, Torrington, Conn., a corporation of Maine Filed June 18, 1963, Ser. No. 288,744
3 Claims. (Cl. 143—32)

The following specification relates to an improved idler pulley and end mounting for a chain saw. The improved combination is designed to fit on the guide bar of an endless chain saw and to provide an antifriction idler around which the chain saw will travel with a minimum of friction.

One of the objects of the invention is to reduce the number of parts required for the assembly of the combined device.

A further object of the invention is to improve the antifriction bearing, minimizing the number of parts which are in operative contact.

A still further object of the invention is to produce a device of this character from thin sheet metal without requiring the use of wheel hubs, cores or other heavy metal parts thus resulting in an exceptionally narrow pulley permitting a correspondingly narrow saw chain.

Among the objects of this invention is to materially reduce the power required for operation of the chain saw.

Other objects of the invention will be apparent from the following description as illustrated in its preferred form on the accompanying drawings in which:

FIGURE 1 is a side elevation, partly in section, of the improved idler pulley and end mounting for a chain saw, and FIGURE 2 is a transverse cross-section on the line 2—2 in FIGURE 1.

Basically, the improved idler pulley for the end mounting is made by substituting thin malleable sheet metal, plates or disks in place of the usual assembly of central hubs, separate inner and outer bearing raceways and separate side plates.

The preferred form of the invention as illustrated in the drawings, comprises a flat sheet metal collar 5, which serves the purpose of an outer raceway for the antifriction elements. It also includes a side extension or wedge 6. This wedge is the usual mode of attachment on the end of the supporting bar of the end saw.

The collar forms a bearing ring 7. This is the outer raceway for the bearing balls.

Two sheet metal disks 8 and 9 formed of thin malleable sheet metal are used to form the rotary element of the idler pulley. These disks are identical and made by stamping or otherwise shaping. They are then mounted back-to-back within the ring 7 by means of rivets 10 or similar fastening, such as welding.

Each disk is dished, that is concave, as shown at 11, 11. In this way the dished portions form a compartment 12 to hold lubricants such as oil with which the antifriction bearing is to be supplied. The dished form of the sheet metal also serves the purpose of improving the rigidity of the pulley.

Each disk is also deformed to provide concentric circular ridges 13. On the inner side these take the form of grooves 14, which are the opposite side and inner races for the bearing balls 15.

In passing it is to be pointed out that the rivets 10 are located between the compartment 12 and the ridges 13.

Outwardly of the ridges 13, the disks 8 and 9 extend as parallel, spaced flanges 16, 16. These form the usual channel for receiving the endless chain saw as it turns from its advance to the reverse direction.

Each disk 8, 9 is provided with a shallow groove. These grooves together form an oil duct 17, running from the compartment 12 to the inner bearing race 14. One of the disks 8, 9 is provided centrally with an oil fitting 18 by which oil or other lubricant may be supplied to the compartment 12.

The idler pulley thus formed of light, thin sheet metal is given materially increased rigidity by the formation of the dished center 11, 11 and the concentric circular ridges 13. It thus has the same strength as idlers which are made up of separate parts including massive hubs. This advantage is obtained without sacrificing the light mass of the rotating parts.

The provision of identical inner raceways on the disks in opposition to the bearing ring 7, is an advantage. The production of a raceway is thus facilitated. The stress against the inner race is divided and shared by each side portion of the inner face. Moreover, there is a greater dissipation of heat from the mounting.

The preferred form of the invention has been shown by way of example. However, it will be evident that minor changes can be made in material and proportions without departing from the invention as defined in the following claims.

What I claim is:

1. An idler pulley and end mounting for a chain saw comprising a flat sheet metal collar having a bore therethrough defined by a wall of said collar, said collar wall being in the form of an outer bearing race, two sheet metal disks of substantially uniform thickness arranged in back-to-back relation and being of a diameter greater than the diameter of said bore, each disk having an intermediate annular portion disposed within said bore in axially centered relation relative to said collar and said intermediate annular portions being secured together in face-to-face relation, said disks having opposed part-circular grooves disposed concentric with said collar wall and disposed immediately radially inwardly adjacent to said collar wall, said grooves having opposed surfaces defining a generally C-shaped inner race opening towards said outer race-forming collar wall, a plurality of bearing balls mounted within said inner race in direct riding engagement with said outer race, and said disks having outer flanges extending radially outwardly of said collar wall, said outer flanges being axially spaced and having said collar positioned therebetween in guided relation.

2. The idler pulley and end mounting of claim 1 wherein the thickness of said collar is less than the diameter of said bearing balls with said bearing balls being retained within said inner race independently of said collar.

3. The idler pulley and end mounting of claim 1 wherein said disks are centrally axially outwardly dished to form a lubricant compartment, and said disks having opposed grooves extending between said lubricant compartment and said inner face and defining a lubricant duct for delivering lubricant from said lubricant compartment to said inner race.

References Cited by the Examiner

UNITED STATES PATENTS 2,532,981 12/50 Wolf.
2,655,813 10/53 Howell ............ 74—230.8 X
2,693,206 11/54 Anttonen .............. 143—32

WILLIAM W. DRYER, Jr., *Primary Examiner.*
DONALD R. SCHRAN, *Examiner.*